Figure 1:
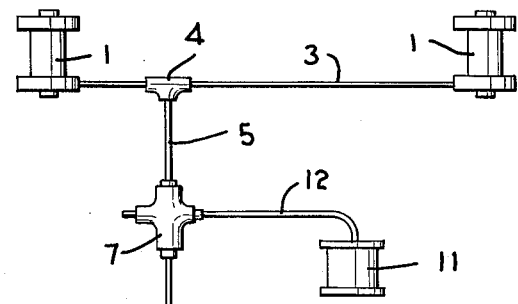

June 5, 1962   W. RAST ETAL   3,037,524
CHECK VALVE FOR MULTI-LINE HYDRAULIC SYSTEMS
Filed Nov. 22, 1960   2 Sheets-Sheet 1

3,037,524
CHECK VALVE FOR MULTI-LINE HYDRAULIC SYSTEMS

Wlodzimierz Rast and Shirley Isabel Rast, both of 46 Kanbara St., Flinders Park, South Australia, Australia
Filed Nov. 22, 1960, Ser. No. 70,965
Claims priority, application Australia Nov. 27, 1959
2 Claims. (Cl. 137—612.1)

This invention relates to a check valve for multi-line hydraulic systems.

One of the problems in multi-line hydraulic systems using pressure to actuate members is that failure of one line will result in failure of all of the lines due to loss of pressure and fluid.

Loss of pressure in hydraulic lines can be a serious matter, as for instance in motor vehicles where the brakes fail as a whole when any of the lines leading to the brakes are fractured or broken.

It is the object of this invention to provide a mechanism which will serve as a check valve to prevent failure of all of the lines in a multi-line hydraulic system when one of the lines is broken.

The object is achieved by providing a check valve for such multi-line hydraulic systems which comprises a sealing plunger associated with each supply line of such system, characterised in that the pressure fluid of the main hydraulic system acts on one side of the sealing plungers and pressure fluid from a spring loaded auxiliary hydraulic system acts on the other side of the sealing plungers, said pressure of the auxiliary system being normally less than the pressure of the main system, whereby the said plungers remain inoperative unless line pressure drops whereupon the sealing plunger associated with that line is moved to its sealing position by the pressure of the auxiliary system.

Only the line affected will of course be sealed because the remaining plungers will remain in their balanced condition and will not seal those lines.

Therefore when one line of a multi-line system is broken, such as by a leak at any point along the line or in the mechanism which it serves, that line is automatically cut off and when the hydraulic pressure is next applied, it will still be maintained on the remaining line and will thus cause the mechanisms fed by those lines to operate.

One of the principal places of use of the invention is in the hydraulic braking system of motor vehicles where at the present time failure of one brake will cause failure of all the other brakes due to loss of the pressure fluid.

A convenient arrangement for a motor vehicle is one where the unit comprises a hollow body, a valve chamber in said hollow body, a supply duct leading to said valve chamber, a plurality of control chambers in said body connected by ducts to said valve chamber and by ducts to the lines of the hydraulic system, a sealing plunger in each said control chamber, a pressure chamber in said hollow body communicating with said control chambers on one side of said sealing plungers, spring urged means in said pressure chamber to maintain pressure on fluid in said pressure chamber, said valves in the valve chamber being adjusted in relation to said pressure means in the pressure chamber to maintain said plungers in an inoperative position when pressure is maintained between said plungers and said line ducts but when pressure is lost in any of said line ducts the associated sealing plunger is forced forward to seal said line duct by the pressure maintained in the said pressure chamber.

Figure 2:
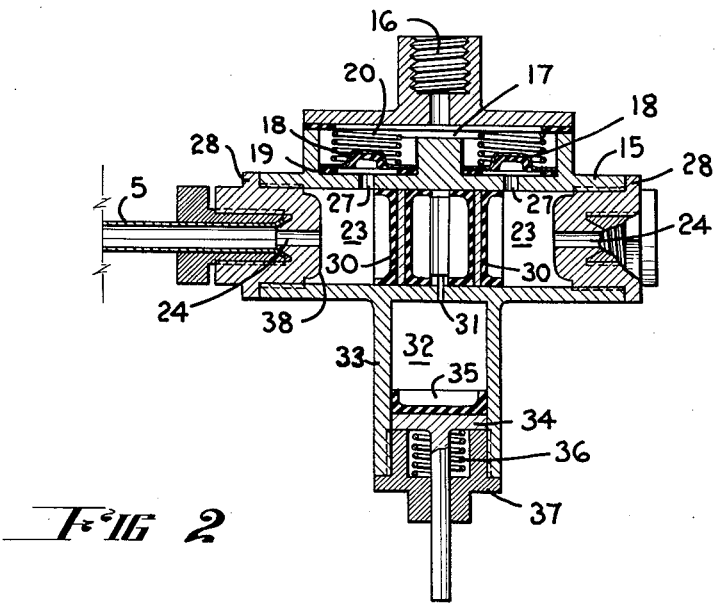
Figure 3:
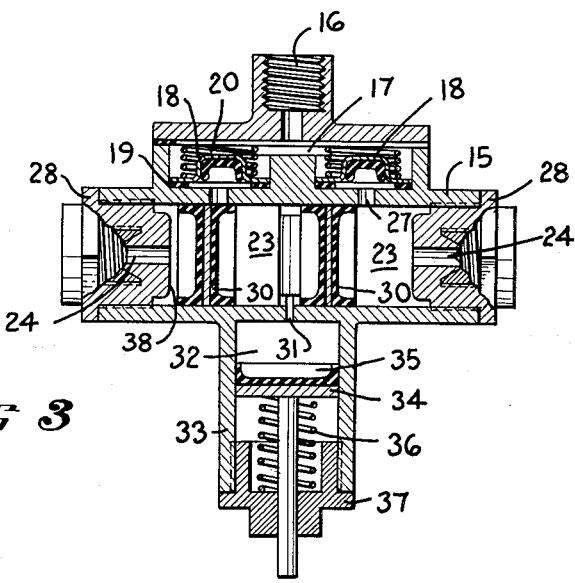
Figure 5:
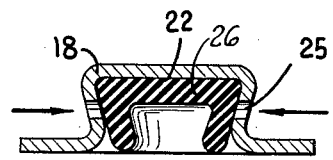

To enable the invention to be fully understood an embodiment thereof will now be described in reference to the accompanying drawings in which:

FIG. 1 is a schematic view including four brake cylinders on a motor vehicle and a master cylinder showing how the invention can be applied thereto, FIG. 2 is a transverse section of the embodiment of the invention in normal operating position where correct pressure are being maintained throughout the system, FIG. 3 is a view corresponding to FIG. 2 but showing the position when a brake line breaks to release the pressure, FIG. 4 is again a similar view to FIG. 2 but showing the position of the parts when actual braking takes place with one of the brake lines out of use through a leakage in the hydraulic line to that brake, and FIG. 5 is an enlarged view of one of the valves in the valve chamber.

In FIG. 1 the forward brake cylinders of the vehicle are designated 1 while the rear brake cylinders of the vehicle are designated 2, the brake cylinders 1 being interconnected by a hydraulic line 3 including a T piece 4 connecting it to the line 5 which connects to one of the line ducts of the valve 7 forming the present invention, the other line duct being connected by means of the hydraulic line 8 to the T piece 9 inserted in the line 10 joining the rear brake cylinders 2.

The master brake cylinder is designated 11 and this is connected by the hydraulic line 12 to the supply duct of the unit 7.

Referring now more particularly to FIGS. 2, 3, 4 and 5, the body 15 is provided with a supply duct 16 which opens into a valve chamber 17 in which are disposed a pair of two-way valves 18, the valves 18 being loaded on to seats 19 by springs 20 within the valve chamber.

The outer members 22 of the valve 18 are normally urged down on to the seat 19 by the pressure of the spring 20 and they control the pressure which can be built up within a series of control chambers 23 also in the body 15 which communicate through line ducts 24 with the lines 5 and 8 respectively.

The member 22 is provided with apertures 25 which allow a flow of oil from the valve chamber 17 into the control chambers 23 when sufficient pressure is applied to the valve chamber 17 through actuation of the master cylinder 11 of the hydraulic system, the outer members 22 carrying within them resilient plugs 26 which are arranged as shown more particularly in FIG. 5 to allow a flow only in the direction of the arrows to prevent return flow through the valve so that when the pressure in the valve chamber 17 exceeds the pressure in the control chambers 23 hydraulic fluid can flow through the apertures 25 in the members 22 past the outside of the plugs 26 which are distorted thereby but when the pressure in the control chambers 23 exceeds the pressure in the valve chamber 17 by an amount sufficient to overcome the resistance of the springs 20 the valve members 18 are lifted from the seats 19 to allow flow between the valve members 18 and the seats from the control chambers to the valve chamber.

The number of control chambers must be the same as the number of lines to be controlled, in the case of the embodiment this being two.

The control chambers 23 communicate with the underside of the valves 18 through the ducts 27.

Each control chamber is closed at one end by a plug 28 to which the respective lines 5 and 8 are connected and at the other end by a sealing plunger 30.

The space behind the sealing plunger 30 communicates through a duct 31 with an auxiliary pressure chamber 32 formed in an extension 33 on the body 15, and within the auxiliary pressure chamber is a piston 34 having a sealing member 35 on it, which piston 34 is urged forward in the pressure chamber 32 by a spring 36 confined between the piston 34 and a cap 37 on the extension 33.

The auxiliary pressure chamber 32 is normally filled with hydraulic fluid so that if the sealing plungers 30 were not restrained within the control chambers 23, the sealing plungers would be forced outwardly in the chambers until they contacted faces 38 on the inner ends of the plugs 28 to seal the line ducts 24, the capacity of the pressure chamber 32 being sufficient to force the sealing plungers 30 out into their sealing locations.

Under normal operating conditions the pressure in the brake lines 3 and 10 which form part of the main system is maintained at a low value, the brakes being forced to their "off" position by spring means in the manner already well known in the hydraulic brake practice.

The pressure within the brake lines is controlled by the valves 18 in the valve chamber 17 which act under influence of the springs 20 and the spring pressure is so adjusted that the pressure in the control chambers 23 always exceeds the pressure exerted by the spring 36 of the auxiliary system under all normal operating conditions so that the piston 34 is held in th position shown in FIG. 2.

Braking can then proceed in the normal manner in that when brake pressure is applied to the master cylinder 11 this pressure is transmitted to the fluid in the line 12 which communicates the pressure to the chamber 17 and through the apertures 25 in the valves 18 to the control chambers 23, the hydraulic fluid flowing outwardly through the line ducts 24 to the hydraulic lines 5 and 8 and thence into the lines 3 and 10 to communicate the pressure into the hydraulic brake cylinders 1 and 2, thus operating the brakes in the normal manner.

When brake pressure is released from the master cylinder 11 the pressure of the springs on the brake shoes acts in the normal way as it does in conventional hydraulic braking systems to force the hydraulic fluid back through the lines 5 and 8, the fluid flowing into the control chambers 23 and through the ducts 27 to beneath the valves 18 which are thereby lifted to return surplus brake fluid into the chamber 17 and thus back through the line 12 to the master cylinder 11.

The device thus does not interfere with the normal function of the hydraulic brakes but should one of the brake lines 5 or 8 or 3 or 10 break, the pressure in the respective control chamber 23 will immediately drop and the condition illustrated in FIG. 3 occur, it being assumed that the left-hand line is broken resulting in the piston 34 moving forward under influence of the spring 36 and forcing the left-hand sealing plunger 30 forwardly towards the left-hand seat 38 until the line duct 24 on that side is closed off.

Figure 4:
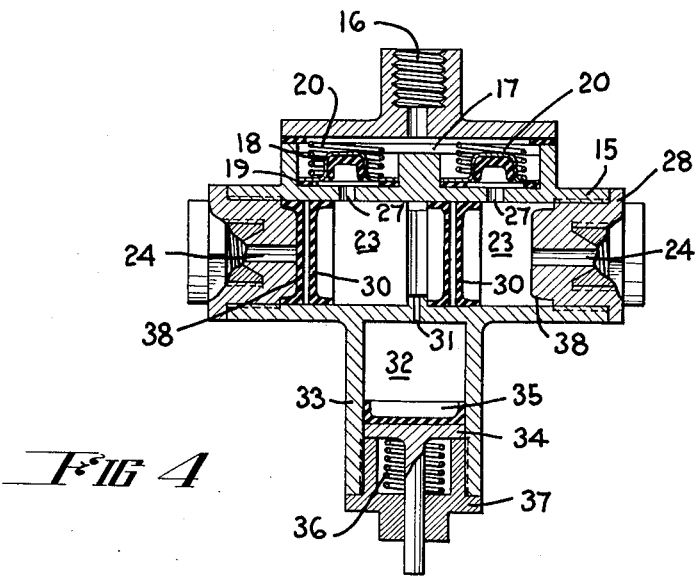

Immediately the brake is actuated and pressure is built up in the valve chamber 17 through the line 12 the condition occurs which is shown in FIG. 4 namely the pressure in both of the control chambers 23 is raised through a flow of hydraulic fluid from the valve chamber 17 through the openings 25 in the valve 18 and the control chamber 23 on the right-hand side of the illustration will allow normal function while the left-hand control chamber 23 will simply have pressure built up in it to act through the duct 31 and restore the piston 34 against pressure of the spring 36 to its original position, the condition shown in FIG. 4 being then maintained until the break in the damaged line or other associated part which caused leakage of the hydraulic fluid is repaired.

Throughout the period between the break and the repair, the brakes controlled by the right-hand control chamber 23 will continue to function in a normal manner but, of course, the operator will be aware that his braking effect has been reduced and will in due course have the damage attended to.

It is obvious that all four hydraulic brakes of a motor vehicle could be separately safeguarded by providing four control chambers 23 with four associated sealing plungers 30 and in fact any number could be used for this purpose.

If it is desired to provide an indicator to show when a line has commenced to leak or is broken, this may be achieved by recording means which show the motion of the spring loaded piston which provides the loading to move the sealing plungers in to their sealing position, downward movement of the piston 34 under influence of its loading spring 36 moving an indicator such as a dial or closing an electrical contact to give a warning light so that the operator then knows that one of the lines is faulty and requires attention.

What we claim is:

1. A check valve for multi-line hydraulic systems comprising a hollow body, a valve chamber in said hollow body, pressure control valves in said chamber, a supply duct leading to said valve chamber, a plurality of control chambers in said body connected by ducts to said valve chamber and by ducts to the lines of the hydraulic system, a sealing plunger in each said control chamber, an auxiliary pressure chamber in said hollow body communicating with said control chambers on one side of said sealing plungers, a piston in the pressure chamber, a sealing member on said piston engaging the wall of the pressure chamber, a pressure spring behind said piston urging said piston into the pressure chamber thereby maintaining pressure on fluid in said pressure chamber, said valves in the valve chamber being adjusted in relation to said pressure spring whereby sufficient pressure is normally maintained in said line ducts to urge said plungers against pressure fluid in said pressure chamber to an inoperative position but when pressure is lost in any of said line ducts the associated sealing plunger is forced forward to seal said line duct by the pressure maintained in the said pressure chamber by said pressure spring.

2. A check valve for multi-line hydraulic systems according to claim 1 characterised in that the pressure control valves in the said valve chamber each comprise an apertured member having a seat on its periphery, a resilient member covering the said apertures disposed on the same side of the said member as the said seat, spring means between the said member and the wall of the valve chamber to urge the said members on to the seat assisted by pressure from the supply duct during actuation of the device but permitting a flow through the said apertures into the said control chambers during the pressure stroke, said springs on the valves in the valve chamber exerting a greater holding force on the said valves than the pressure spring on the piston in the pressure chamber, whereby pressure in the control chamber is under all normal conditions maintained sufficiently high to keep the said spring in the pressure chamber compressed but to allow the spring to move the said piston forwardly when pressure in the said control chamber drops due to leakage in a line.

References Cited in the file of this patent

UNITED STATES PATENTS

| | | |
|---|---|---|
| 2,074,361 | Bowen | Mar. 23, 1937 |
| 2,467,813 | Coney | Apr. 19, 1949 |

FOREIGN PATENTS

| | | |
|---|---|---|
| 226,590 | Switzerland | of 1943 |